(12) United States Patent
Yoshino et al.

(10) Patent No.: US 8,780,995 B2
(45) Date of Patent: Jul. 15, 2014

(54) VIDEO ENCODING APPARATUS AND VIDEO DECODING APPARATUS

(75) Inventors: Tomonobu Yoshino, Saitama-ken (JP); Sei Naito, Saitama-ken (JP); Shigeyuki Sakazawa, Saitama-ken (JP)

(73) Assignee: KDDI R&D Laboratories Inc., Saitama-ken (JP)

( * ) Notice: Subject to any disclaimer, the term of this patent is extended or adjusted under 35 U.S.C. 154(b) by 560 days.

(21) Appl. No.: 12/963,138

(22) Filed: Dec. 8, 2010

(65) Prior Publication Data

US 2011/0158324 A1    Jun. 30, 2011

(30) Foreign Application Priority Data

Dec. 25, 2009  (JP) ................................ 2009-294618

(51) Int. Cl.
*H04N 7/12*  (2006.01)
*H04N 11/02*  (2006.01)
*H04N 11/04*  (2006.01)
*H04B 1/66*  (2006.01)
*G06K 9/36*  (2006.01)
*G06K 9/46*  (2006.01)

(52) U.S. Cl.
USPC ............ 375/240.24; 375/240.16; 375/240.17; 375/240.21; 375/240.29; 382/238

(58) Field of Classification Search
USPC .................................................. 375/240–241
See application file for complete search history.

(56) References Cited

U.S. PATENT DOCUMENTS

| | | | | |
|---|---|---|---|---|
| 4,965,667 | A | * | 10/1990 | Trew et al. ................ 375/240.21 |
| 2003/0169931 | A1 | | 9/2003 | Lainema |
| 2004/0076333 | A1 | * | 4/2004 | Zhang et al. .................. 382/238 |
| 2006/0294171 | A1 | | 12/2006 | Bossen et al. |
| 2007/0053441 | A1 | * | 3/2007 | Wang et al. .............. 375/240.24 |
| 2009/0257503 | A1 | * | 10/2009 | Ye et al. .................... 375/240.17 |
| 2010/0013947 | A1 | * | 1/2010 | Oikawa ....................... 348/222.1 |

FOREIGN PATENT DOCUMENTS

| | | |
|---|---|---|
| JP | 2005514872 | 5/2005 |
| JP | 2005-151385 | 6/2005 |
| JP | 2006279383 | 10/2006 |
| JP | 2008544708 | 12/2008 |

OTHER PUBLICATIONS

Joint Video Team(JVT) of ISO/IEC MPEG and ITU-T VCEG, "Text of ISO/IEC 14496-10 Advanced Video Coding," Jul. 2004.

(Continued)

*Primary Examiner* — Joseph Ustaris
*Assistant Examiner* — Farhan Mahmud
(74) *Attorney, Agent, or Firm* — BainwoodHuang

(57) ABSTRACT

It is a purpose of the present invention to provide a video encoding apparatus and a video decoding apparatus which are capable of providing real-time processing having improved coding performance. A video encoding apparatus AA includes an inter-encoding predicted value generating unit 2 configured to receive, as input signals, an input image a, a local decoded value d acquired from an encoded block, prediction direction information e acquired from the encoded block, and interpolation filter initial control information b. The inter-encoding predicted value generating unit 2 includes a filter control unit 21. The filter control unit 21 extracts the tap size N of the interpolation filter and the initial value $c_0(i,j)$ of the filter coefficient of the interpolation filter from the interpolation filter initial control information b, and uses the initial value $c_0(i,j)$ of the filter coefficient of the interpolation filter as the filter coefficient $c(i,j)$ of the interpolation filter.

19 Claims, 4 Drawing Sheets

(56) References Cited

OTHER PUBLICATIONS

Thomas Wedi, "Adaptive Interpolation Filters and High-Resolution Displacements for Video Coding," IEEE Trans. on Circuits and Systems for Video Technology, vol. 16, No. 4, Apr. 2006.

Yuri Vatis and Joern Ostermann, "Adaptive Interpolation Filter for H.264/AVC," IEEE Trans. on Circuits and Systems for Video Technology, vol. 19, No. 2, Feb. 2009.

* cited by examiner

VIDEO ENCODING APPARATUS AND VIDEO DECODING APPARATUS

This application is based on and claims the benefit of priority from Japanese Patent Application No. 2009-294618, filed on 25 Dec. 2009, the content of which is incorporated herein by reference.

BACKGROUND OF THE INVENTION

1. Field of the Invention

The present invention relates to a video encoding apparatus configured to encode a video and a video decoding apparatus configured to decode a video encoded by the video encoding apparatus.

2. Description of the Related Art

Conventional techniques have been proposed which allow inter-frame prediction to be performed when a video is encoded (see Joint Video Team (JVT) of ISO/IEC MPEG and ITU-T VCEG, "Text of ISO/IEC 14496-10 Advanced Video Coding", July 2004, for example). With such inter-frame prediction, a region having a pattern similar to that of an encoding target region is detected from an image which has already been encoded, and the pixel values of the region thus detected are used as the predicted value of the encoding target region. In the following description, the processing for obtaining the prediction error that occurs in inter-frame prediction will be referred to as "motion compensation". Also, a spatial vector that indicates motion from an encoding target region to a similar region which has already been encoded will be referred to as an "MV (Motion Vector)".

With the technique described in Joint Video Team(JVT) of ISO/IEC MPEG and ITU-T VCEG, "Text of ISO/IEC 14496-10 Advanced Video Coding", a pixel value at an intermediate position is generated (fractional position accuracy), and such a pixel value can be used as a predicted value in addition to a pixel value at an integer sampling position (integer position accuracy) when the similar region is detected (motion detection). The technique described here provides inter-frame prediction at quarter-pixel precision.

Also, as interpolation processing (processing using an interpolation filter) performed in a step for detecting motion with fractional position accuracy, a method (method using an adaptive interpolation filter) has been proposed in which processing is performed on a video pattern in an adaptive manner (see Thomas Wedi, "Adaptive Interpolation Filters and High-Resolution Displacements for Video Coding," IEEE Trans. on Circuits and Systems for Video Technology, Vol. 16, No. 4, April 2006 and Yuri Vatis and Joern Ostermann, "Adaptive Interpolation Filter for H.264/AVC," IEEE Trans. on Circuits and Systems for Video Technology, Vol. 19, No. 2, February 2009, for example). The techniques described in Thomas Wedi, and Yuri Vatis and Joern Ostermann, provide improved encoding performance as compared with the technique described in the aforementioned Joint Video Team(JVT) of ISO/IEC MPEG and ITU-T VCEG, "Text of ISO/IEC 14496-10 Advanced Video Coding".

With the methods described in Thomas Wedi, and Yuri Vatis and Joern Ostermann, operations are performed using the pixel values of an image to be encoded (which will be referred to as the "raw image") and the pixel values of the encoded image (which will be referred to as the "reference image") so as to determine an optimal interpolation filter for the raw image.

Here, in order to determine such an optimal interpolation filter for the raw image, a motion vector in the raw image is required. Before such a motion vector is obtained in the raw image, there is a need to perform encoding processing on the raw image so as to obtain the motion vector. Accordingly, there is a need to perform encoding processing on the raw image multiple times.

Furthermore, in order to determine such an optimal filter for the raw image, there is a need to solve equations corresponding to the number of taps.

As described above, the methods described in Thomas Wedi, and Yuri Vatis and Joern Ostermann, require a large amount of operations, leading to a long processing time. There is a demand for providing real-time processing in a video encoding apparatus and a video decoding apparatus. However, in a case in which an adaptive interpolation filter is applied, in some cases, such an arrangement is not capable of providing such real-time processing.

The present invention has been made in order to solve the aforementioned problems. Accordingly, it is a general purpose of the present invention to provide a video encoding apparatus and a video decoding apparatus which are capable of providing real-time processing having improved encoding performance.

SUMMARY OF THE INVENTION

In order to solve the aforementioned problems, the present invention provides the following embodiments.

For purposes of summarizing the invention, certain aspects of the invention have been described herein. It is to be expressly understood that it is not intended as a definition of the limits of the invention.

An embodiment of the present invention relates to a video encoding apparatus configured to be capable of using an interpolated value with fractional position accuracy to perform prediction encoding based upon block matching between different frames. The video encoding apparatus comprises: an input reception unit configured to receive the number of taps set for an interpolation filter and an initial value of an interpolation filter coefficient; an interpolation filter generating unit configured to generate an interpolation filter based upon the initial value of the interpolation filter coefficient received by the input reception unit; and an encoded data generating unit configured to generate encoded data using the interpolation filter generated by the interpolation filter generating unit.

Another embodiment of the present invention relates to a video decoding apparatus configured to decode encoded data generated by the video encoding apparatus according to the aforementioned embodiment. The video decoding apparatus comprises: a decoding-side input reception unit configured to receive, as input signals, the number of taps set for the interpolation filter and the initial value of the interpolation filter coefficient, which are received by the input reception unit; and a decoded data generating unit configured to decode the encoded data using the number of taps set for the interpolation filter and the initial value of the interpolation filter coefficient, which are received by the decoding-side input reception unit, thereby generating the decoded data.

Also, with the video encoding apparatus, the interpolation filter generating unit may update the interpolation filter coefficient with respect to the initial value of the interpolation filter coefficient received by the input reception unit, based upon the number of taps set for the interpolation filter received by the input reception unit and the video image feature values, and may generate an interpolation filter based upon the interpolation filter coefficient thus updated.

Also, with the video encoding apparatus, the interpolation filter generating unit may determine a main band, the filter characteristics of which are to be changed, based upon the video image feature values of an image to be encoded. Also, the interpolation filter generating unit may determine the change of the filter characteristics to be applied to the main band, the filter characteristics of which are to be changed, based upon the video image feature values of an image to be encoded and the video image feature values of an encoded image. Also, the interpolation filter generating unit may update the interpolation filter coefficient with respect to the initial value of the interpolation filter coefficient received by the input reception unit, based upon the number of taps set for the interpolation filter received by the input reception unit and the change of the filter characteristics thus determined, and may generate an interpolation filter based upon the interpolation filter coefficient thus updated.

Also, with the video encoding apparatus, one from among the pixel value variance and the inter-pixel correlation of the pixel values may be used for the video image feature values.

An embodiment of the present invention relates to a video decoding apparatus configured to decode encoded data generated by the video encoding apparatus according to any one of the aforementioned embodiments. The video decoding apparatus comprises: a decoding-side input reception unit configured to receive, as input signals, the number of taps set for the interpolation filter and the initial value of the interpolation filter coefficient, which are received by the input reception unit; and a decoded data generating unit configured to decode the encoded data using the number of taps set for the interpolation filter and the initial value of the interpolation filter coefficient, which are received by the decoding-side input reception unit, and the video image feature values, thereby generating the decoded data.

Also, with the video encoding apparatus, the interpolation filter generating unit may update the interpolation filter coefficient with respect to the initial value of the interpolation filter coefficient received by the input reception unit, based upon the number of taps set for the interpolation filter received by the input reception unit and upon the encoding control information, and may generate an interpolation filter based upon the interpolation filter coefficient thus updated.

Also, with the video encoding apparatus, the interpolation filter generating unit may determine a main band, the filter characteristics of which are to be changed, and the amount of change in the filter characteristics to be applied to the band, based upon the encoding control information. Also, the interpolation filter generating unit may update the interpolation filter coefficient with respect to the initial value of the interpolation filter coefficient received by the input reception unit, based upon the number of taps set for the interpolation filter received by the input reception unit and upon the encoding control information, and may generate an interpolation filter based upon the interpolation filter coefficient thus updated.

Also, with the video encoding apparatus, a quantization parameter or a quantization step size may be used as the video image feature values.

An embodiment of the present invention relates to a video decoding apparatus configured to decode encoded data generated by the video encoding apparatus according to any one of the aforementioned embodiments. The video decoding apparatus comprises: a decoding-side input reception unit configured to receive, as input signals, the number of taps set for the interpolation filter and the initial value of the interpolation filter coefficient which are received by the input reception unit; and a decoded data generating unit configured to decode the encoded data using the number of taps set for the interpolation filter and the initial value of the interpolation filter coefficient which are received by the decoding-side input reception unit, and the coding control information, thereby generating the decoded data.

Also, with the video encoding apparatus, the interpolation filter generating unit may update the interpolation filter coefficient with respect to the initial value of the interpolation filter coefficient received by the input reception unit, based upon the number of taps set for the interpolation filter received by the input reception unit and frequency characteristics, and may generate an interpolation filter based upon the interpolation filter coefficient thus updated.

Also, with the video encoding apparatus, the interpolation filter generating unit may determine a main band, the filter characteristics of which are to be changed, based upon the frequency characteristics of an image to be encoded. Also, the interpolation filter generating unit may determine the amount of change in the filter characteristics to be applied to the main band, the filter characteristics of which are to be changed, based upon the frequency characteristics of the image to be encoded and the frequency characteristics of an encoded image. Also, the interpolation filter generating unit may update the interpolation filter coefficient with respect to the initial value of the interpolation filter coefficient received by the input reception unit, based upon the number of taps set for the interpolation filter received by the input reception unit and upon the amount of change in the filter characteristics thus determined, and may generate an interpolation filter based upon the interpolation filter coefficient thus updated.

An embodiment of the present invention relates to a video decoding apparatus configured to decode encoded data generated by the video encoding apparatus according to any one of the aforementioned embodiments. The video decoding apparatus comprises: a decoding-side input reception unit configured to receive, as input signals, the number of taps set for the interpolation filter and the initial value of the interpolation filter coefficient, which are received by the input reception unit; and a decoded data generating unit configured to decode the encoded data using the number of taps set for the interpolation filter and the initial value of the interpolation filter coefficient, which are received by the decoding-side input reception unit, and the frequency characteristics, thereby generating the decoded data.

With the present invention, the interpolation filter can be determined without involving large amounts of operations. Thus, such an arrangement provides real-time processing having improved coding performance.

DETAILED DESCRIPTION OF THE INVENTION

Description will be made below regarding embodiments of the present invention with reference to the drawings. It should be noted that each of the components of the following embodiments can be replaced by a different known component or the like as appropriate. Also, any kind of variation may be made including a combination with other known components. That is to say, the following embodiments described below do not intend to limit the content of the present invention described in the appended claims.

[First Embodiment]

[Configuration of Video Encoding Apparatus AA]

Figure 1:
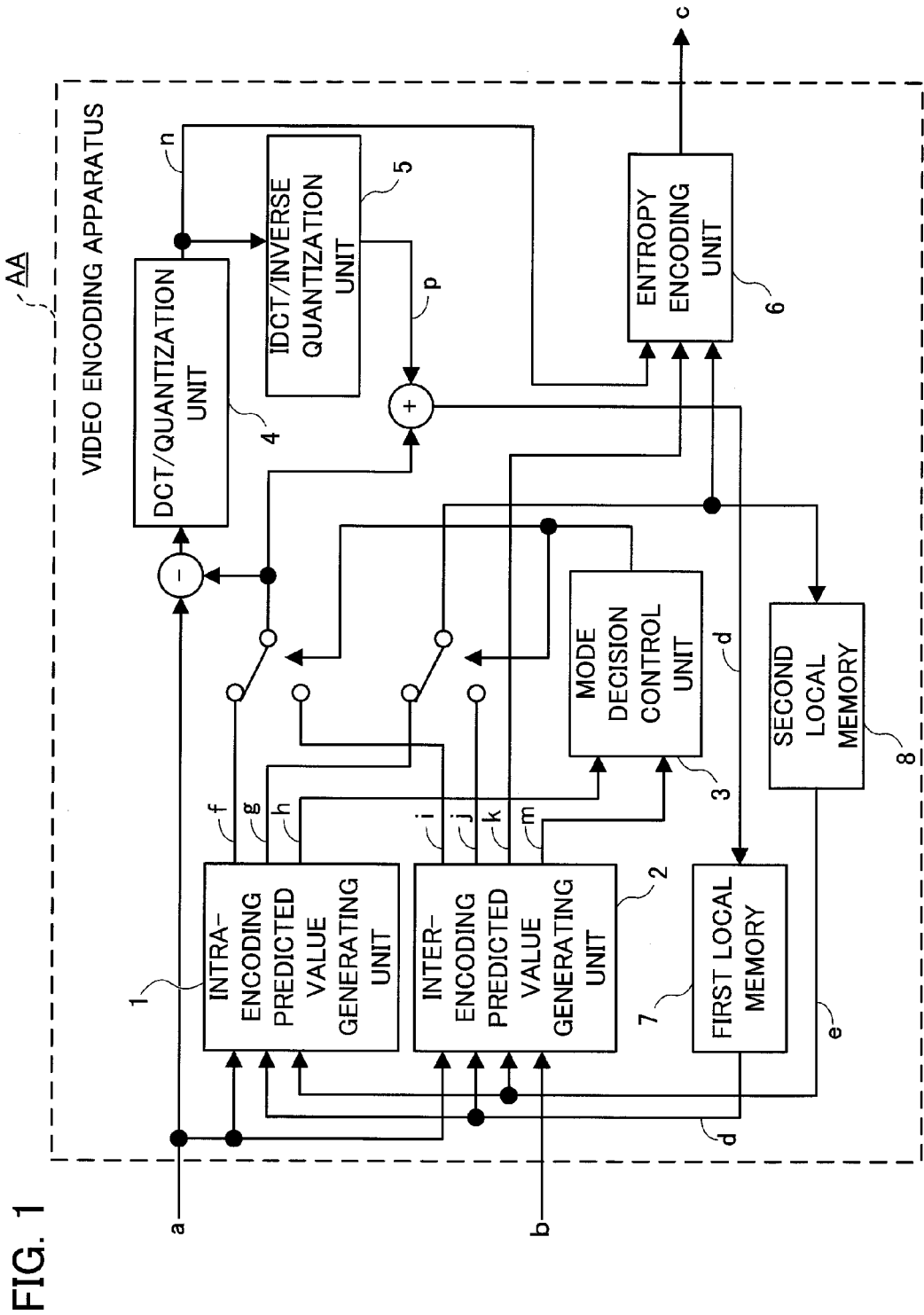
FIG. 1 is a block diagram which shows a configuration of a video encoding apparatus according to a first embodiment of the present invention.

FIG. 1 is a block diagram which shows a configuration of a video encoding apparatus AA according to a first embodiment of the present invention. The video encoding apparatus AA includes an intra-encoding predicted value generating unit 1, an inter-encoding predicted value generating unit 2, a mode decision control unit 3, a DCT/quantization unit 4, an IDCT/inverse quantization unit 5, an entropy encoding unit 6, first local memory 7, and second local memory 8.

The intra-encoding predicted value generating unit 1 receives, as input signals, an input video image a, a local decoded value d with respect to an encoded block, and prediction direction information e with respect to the encoded block. The intra-encoding predicted value generating unit 1 generates a predicted value based upon the local decoded value d with respect to the encoded block, and calculates the difference between the predicted value thus generated and the input signal so as to calculate the encoding distortion. In the following step, a cost value h required for the encoding is calculated based upon the encoding distortion thus calculated and the prediction direction information e for the encoded block. Subsequently, the intra-encoding predicted value generating unit 1 outputs the intra-predicted value f, the intra-prediction information g, and the encoding cost value h.

The inter-encoding predicted value generating unit 2 receives, as input signals, the input video image a, the local decoded value d with respect to the encoded block, the prediction direction information e with respect to the encoded block, and interpolation filter initial control information b. The interpolation filter initial control information b includes a tap size N (N is an integer which satisfies the relation N≥1) of the interpolation filter, and an initial value $c_0(i,j)$ of the filter coefficient of the interpolation filter (i is an integer which satisfies the relation 0≤i≤N, and j is an integer which satisfies the relation 0≤i≤N). Here, the initial value $c_0(i,j)$ of the filter coefficient of the interpolation filter represents the initial value of the filter coefficient $c(i,j)$ of the interpolation filter. The inter-encoding predicted value generating unit 2 outputs an inter-predicted value i, inter-prediction information (including motion vector) j, interpolation filter control information k, and an encoding cost value m. Detailed description will be made later with reference to FIG. 2 regarding the inter-encoding predicted value generating unit 2.

The mode decision control unit 3 receives, as input signals, the encoding cost value h output from the intra-encoding predicted value generating unit 1 and the encoding cost value m output from the inter-encoding predicted value generating unit 2. The mode decision control unit 3 makes a comparison between the cost values h and m thus input, and selects an encoding mode suitable for the processing block.

The DCT/quantization unit 4 receives, as an input signal, the difference between the input video image a and a predicted value selected from either the intra-predicted value f or the inter-predicted value i according to the encoding mode selected by the mode decision control unit 3. That is, with respect to the selection of either the intra-predicted value f or the inter-predicted value i according to the corresponding encoding mode selected by the mode decision control unit 3, when intra-encoding is selected by the mode decision control unit 3, the intra-predicted value f is selected as the predicted value, and when inter-encoding is selected by the mode decision unit 3, the inter-predicted value i is selected. The DCT/quantization unit 4 performs DCT processing and quantization processing on the input signal, and outputs the resulting signal in the form of a quantized DCT coefficient (residual signal) n.

The IDCT/inverse quantization unit 5 receives, as an input signal, the quantized DCT coefficient (residual signal) n. The IDCT/inverse quantization unit 5 performs inverse DCT processing and inverse quantization processing on the input signal, and outputs the resulting signal as a pixel signal p subjected to inverse DCT.

The entropy encoding unit 6 receives, as input signals, the quantized DCT coefficient (residual signal) n, the prediction information selected from either the intra-prediction information g or the inter-prediction information j according to the encoding mode selected by the mode decision control unit 3, and the interpolation filter control information k. That is, with respect to the selection of either the intra-prediction information g or the inter-prediction information j according to the encoding mode selected by the mode decision control unit 3, when intra-encoding is selected by the mode decision control unit 3, the intra-encoding information g is selected as the prediction information, and when inter-encoding is selected by the mode decision control unit 3, the inter-encoding information j is selected. The entropy encoding unit 6 performs entropy encoding processing on the input signal, and outputs the resulting signal as encoded data c.

The first local memory 7 receives, as an input signal, a signal obtained by summing the predicted value selected from either the intra-predicted value f or the inter-predicted value i according to the encoding mode selected by the mode decision control unit 3 and the pixel signal p subjected to inverse DCT, i.e., the local decoded value d with respect to the encoded block. That is, with respect to the selection of either the intra-predicted value f or the inter-predicted value i according to the encoding mode thus selected by the mode decision control unit 3, when intra-encoding is selected by the mode decision control unit 3, the intra-predicted value f is selected, and when inter-encoding is selected by the mode decision control unit 3, the inter-predicted value i is selected. The first local memory 7 stores the local decoded value d with respect to the encoded block, and, as appropriate, supplies the local decoded value d thus stored to the intra-encoding predicted value generating unit 1 and the inter-encoding predicted value generating unit 2.

The second local memory 8 receives, as an input signal, the prediction information selected from either the intra-prediction information g or the inter-prediction information j according to the encoding mode selected by the mode decision control unit 3, i.e., the prediction direction information e with respect to the encoded block. That is, with respect to the selection of either the intra-prediction information g or the inter-prediction information j according to the corresponding encoding mode selected by the mode decision control unit 3, when intra-encoding is selected by the mode decision control unit 3, the intra-prediction information g is selected as the prediction information, and when inter-encoding is selected by the mode decision control unit 3, the inter-prediction information j is selected. The second local memory 2 stores the prediction direction information e with respect to the encoded block, and, as appropriate, supplies the prediction direction information e thus stored to the intra-encoding predicted generating unit 1 and the inter-encoding predicted value generating unit 2.

[Configuration of Inter-Encoding Predicted Value Generating Unit 2]

Figure 2:
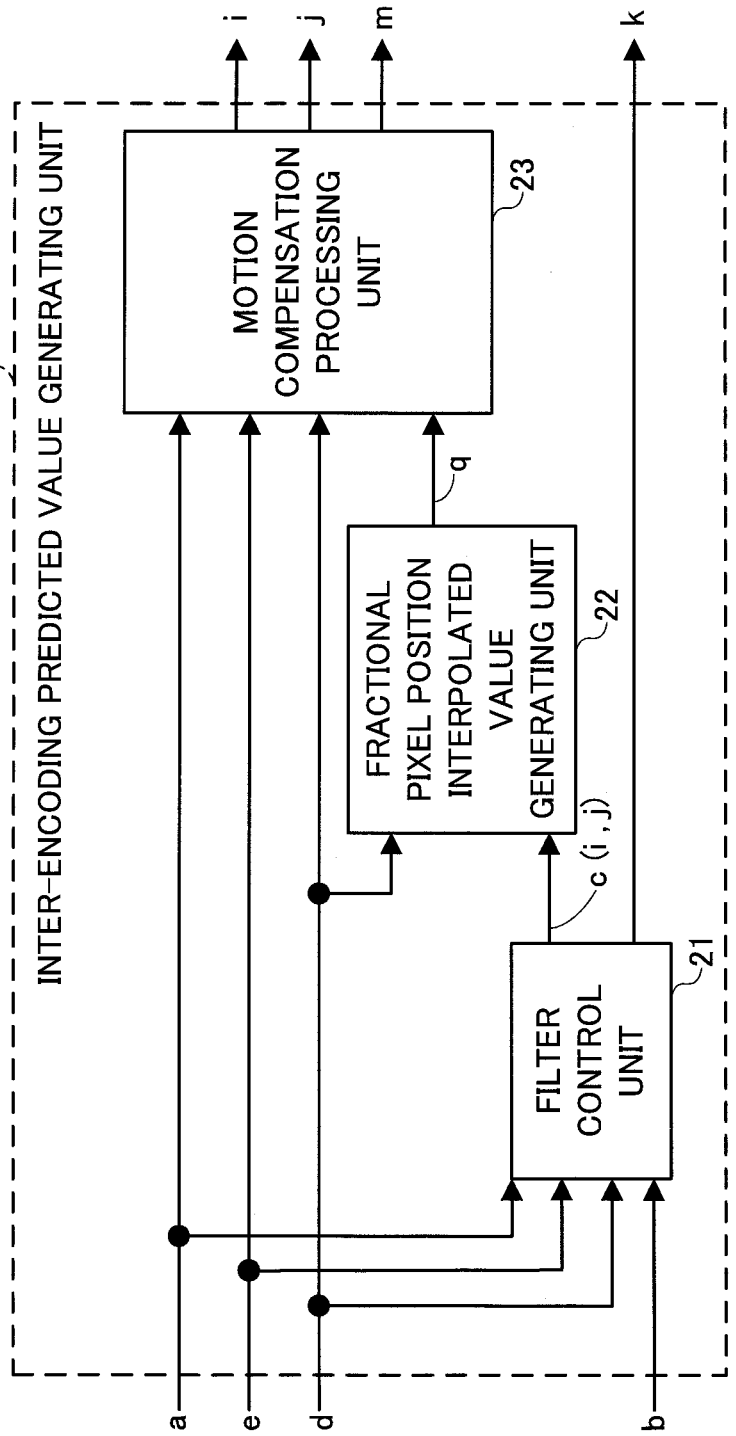
FIG. 2 is a block diagram which shows a configuration of an inter-encoding predicted value generating unit included in the video encoding apparatus.

FIG. 2 is a block diagram which shows a configuration of the inter-encoding predicted value generating unit 2. The inter-encoding predicted value generating unit 2 includes a filter control unit 21, a fractional position interpolated value generating unit 22, and a motion compensation processing unit 23.

The filter control unit 21 receives, as input signals, the input video image a, the local decoded value d with respect to the encoded block, the prediction direction information e with respect to the encoded block, and the interpolation filter initial control information b. The filter control unit 21 determines the filter coefficient $c(i,j)$ of the interpolation filter in increments of frames based upon the information thus input using a first method described later, and outputs the filter coefficient $c(i,j)$ of the interpolation filter and the interpolation filter control information k.

The fractional position interpolated value generating unit 22 inputs, as input signals, the local decoded value d with respect to the encoded block and the filter coefficient $c(i,j)$ of the interpolation filter. The fractional position interpolated value generating unit 22 performs interpolation processing on the local decoded value d with respect to the encoded block using the filter coefficient $c(i,j)$ of the interpolation filter so as to generate an interpolated value at a fractional pixel position. The fractional position interpolated value generating unit 22 outputs the resulting value as an interpolated value q at the fractional pixel position with respect to the local decoded value d.

The motion compensation processing unit 23 receives, as input signals, the input video image a, the local decoded value d with respect to the encoded block, the prediction direction information e with respect to the encoded block, and the interpolated value q with respect to the local decoded value d at the fractional pixel position. The motion compensation processing unit 23 performs motion compensation prediction for the encoded block based upon the input video image a, the local decoded value d, and the interpolated value q so as to calculate the motion vector. Furthermore, the motion compensation processing unit 23 calculates the difference between the motion vector thus obtained and the predicted vector obtained based upon the prediction direction information e, thereby obtaining the inter-prediction control information to be encoded. Moreover, the motion compensation processing unit 23 calculates the cost value of the inter-encoding based upon the prediction error and an amount of encoding operations thus generated. Subsequently, the motion compensation processing unit 23 outputs the resulting values as the inter-predicted value i, the inter-prediction information j, and the encoding cost value m.

[First Embodiment]

Description will be made below regarding a first method employed in the aforementioned filter control unit 21. With the first method, the tap size N of the interpolation filter and the initial value $c_0(i,j)$ of the filter coefficient of the interpolation filter are extracted from the interpolation filter initial control information b. The initial value $c_0(i,j)$ of the filter coefficient of the interpolation filter thus extracted is determined as the filter coefficient $c(i,j)$ of the interpolation filter. Subsequently, the filter coefficient $c(i,j)$ of the interpolation filter thus determined and the interpolation filter control information k are output. It should be noted that the interpolation filter control information k includes the tap size N of the interpolation filter and the initial value $c_0(i,j)$ of the filter coefficient of the interpolation filter.

[Configuration of Video Decoding Apparatus BB]

Figure 3:
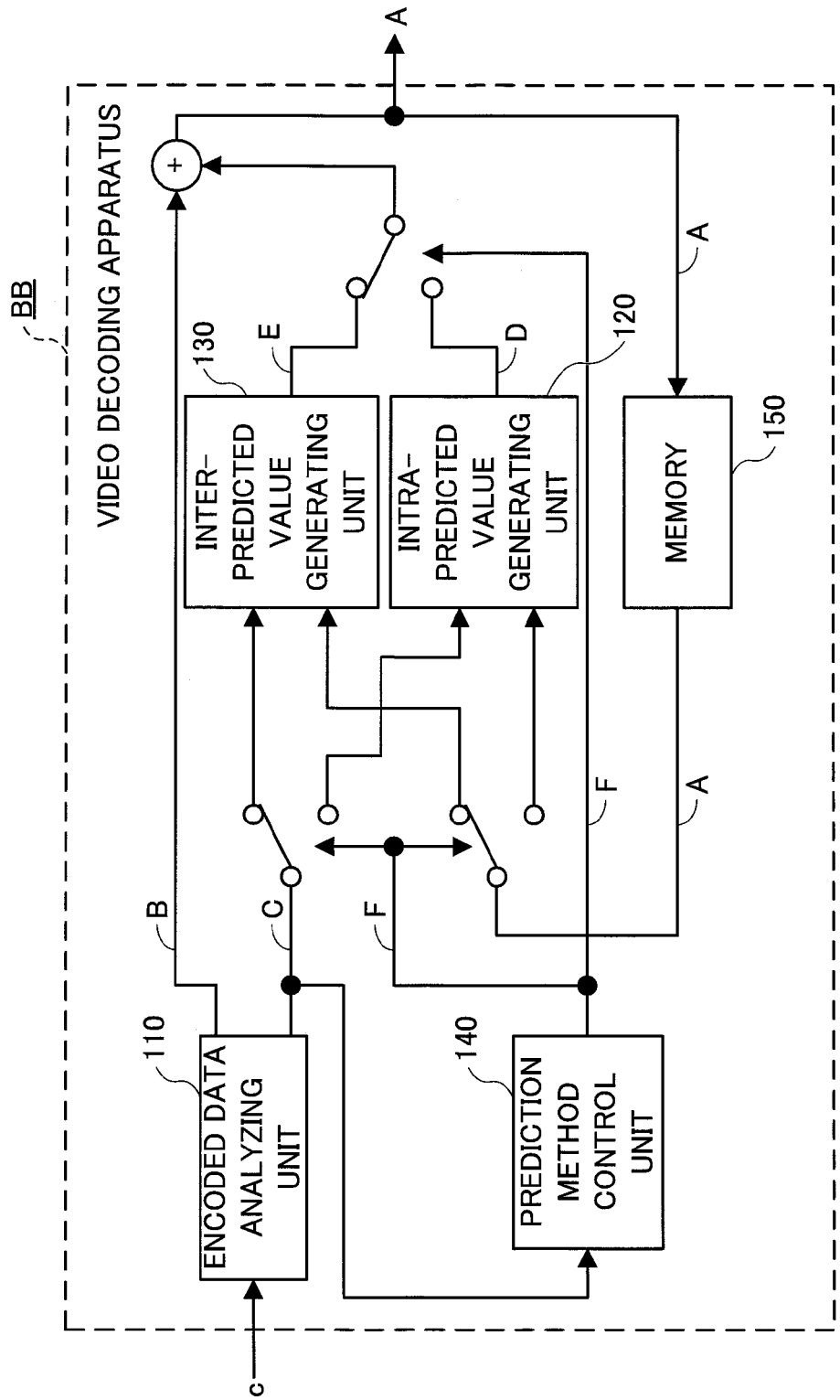
FIG. 3 is a block diagram which shows a configuration of a video decoding apparatus according to the first embodiment of the present invention.

FIG. 3 is a block diagram which shows a configuration of a video decoding apparatus BB according to the first embodiment of the present invention. The video decoding apparatus BB includes an encoded data analyzing unit 110, an intra-predicted value generating unit 120, an inter-predicted value generating unit 130, a prediction method control unit 140, and memory 150, and is configured to decode the encoded data c generated by the video encoding apparatus AA.

The encoding data analyzing unit 110 receives the encoded data c as an input signal. First, the encoded data analyzing unit 110 analyzes the content recorded in the encoded data c according to the coding syntax, and entropy decodes the encoded data c. Subsequently, the encoded data analyzing unit 110 outputs the entropy decoded residual signal B and the entropy decoded prediction information C, which are obtained as a result of the entropy decoding. It should be noted that the entropy decoded prediction information C includes the interpolation filter control information k.

The prediction method control unit 140 receives, as an input signal, the entropy decoded prediction information C. The prediction method control unit 140 judged whether the entropy decoded prediction information C corresponds to the intra-prediction or the inter-prediction, and outputs a control signal F which is used to switch the mode between intra-prediction and the inter-prediction.

The entropy decoded prediction information C and the decoded pixel values A are input to either the intra-predicted value generating unit 120 or the inter-predicted value generating unit 130 according to the control signal F. Specifically, in a case in which the prediction method control unit 140 judges that the entropy decoded prediction information C corresponds to intra-prediction, the entropy decoded prediction information C and the decoded pixel values A are input to the intra-predicted value generating unit 120. On the other hand, in a case in which the prediction method control unit 140 judges that the entropy decoded prediction information C corresponds to inter-prediction, the entropy decoded prediction information C and the decoded pixel values A are input to the inter-predicted value generating unit 130.

The intra-predicted value generating unit 120 generates the intra-predicted value D based upon the decoded pixel values A according to the entropy decoded prediction information C, and outputs the intra-predicted value D thus generated.

The inter-predicted value generating unit 130 generates the inter-predicted value E based upon the decoded pixel values A according to the entropy decoded prediction information C, and outputs the inter-predicted value E thus generated. Detailed description will be made later with reference to FIG. 4 regarding the inter-predicted value generating unit 130.

The memory 150 receives, as an input signal, a signal obtained by summing the entropy decoded residual signal B and the predicted value selected from either the intra-predicted value D or the inter-predicted value E according to the control signal F, i.e., the decoded pixel values A. That is, with respect to the selection of either the intra-predicted value D or the inter-predicted value E according to the control signal F, when the prediction method control unit 140 judges that the entropy decoded prediction information C corresponds to intra-prediction, the intra-predicted value D is selected, and when the prediction method control unit 140 judges that the entropy decoded prediction information C corresponds to inter-prediction, the inter-predicted value E is selected. The memory 150 stores the decoded pixel values A thus input, and, as appropriate, supplies the decoded pixel values A thus stored to the intra-predicted value generating unit 120 or the inter-predicted value generating unit 130 when the decoding processing is performed on a block that has not been decoded.
[Configuration of Inter-Predicted Value Generating Unit 130]

Figure 4:
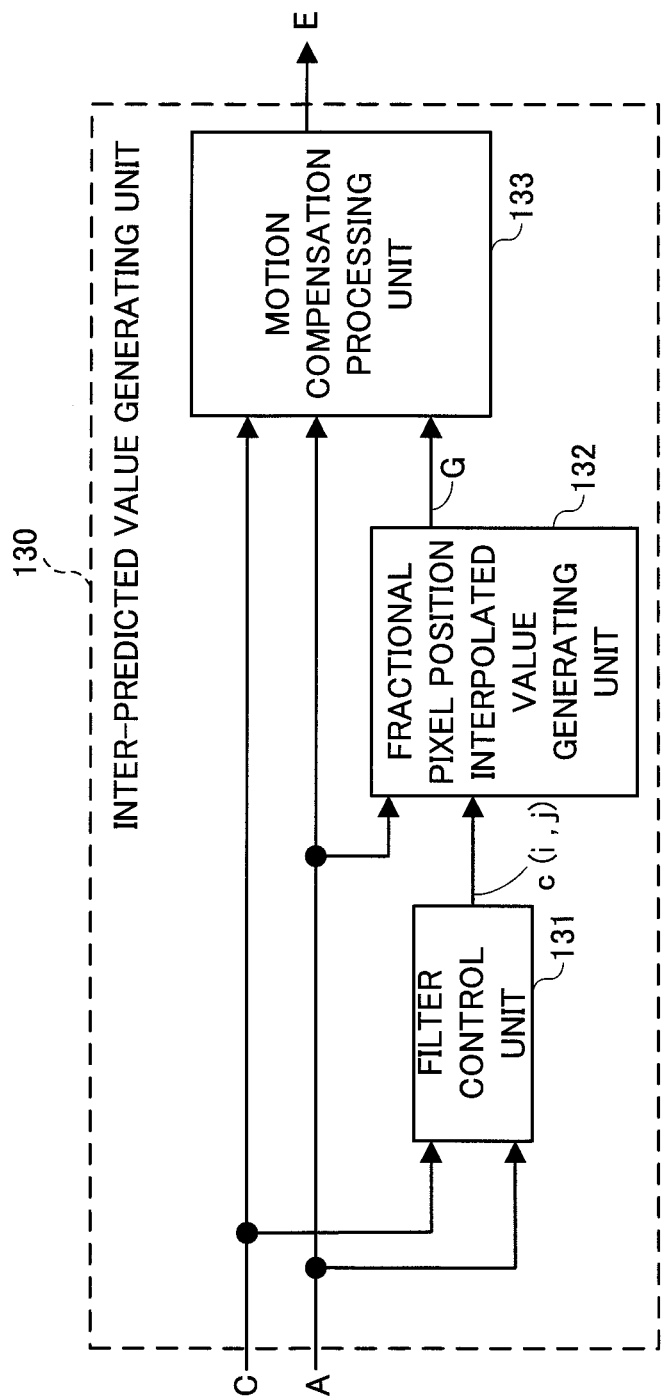
FIG. 4 is a block diagram which shows a configuration of an inter-prediction value generating unit included in the video decoding apparatus.

FIG. 4 is a block diagram which shows a configuration of the inter-predicted value generating unit 130. The inter-predicted value generating unit 130 includes a filter control unit 131, a fractional position interpolated value generating unit 132, and a motion compensation processing unit 133.

The filter control unit 131 receives, as input signals, the decoded pixel values A and the entropy decoded prediction information C. The filter control unit 131 determines the filter coefficient c(i,j) of the interpolation filter based upon the information thus input, using a second method described later, and outputs the filter coefficient c(i,j) thus determined.

The fractional position interpolated value generating unit 132 receives, as input signals, the decoded pixel values A and the filter coefficient c(i,j) of the interpolation filter. With such an arrangement, the fractional position interpolated value generating unit 132 generates an interpolated value at a fractional pixel position using the filter coefficient c(i,j) of the interpolation filter, and outputs the interpolated value thus generated as the interpolated value G at a fractional pixel position with respect to the decoded pixel values A.

The motion compensation processing unit 133 receives, as input signals, the decoded pixel values A, the entropy decoded prediction information C, and the interpolated value G at a fractional pixel position with respect to the decoded pixel values A. The motion compensation processing unit 133 generates the inter-predicted value E with reference to the decoded pixel values A and the interpolated value G based upon the motion vector generated based upon the entropy decoded prediction information C, and outputs the inter-predicted value E thus generated.

[Second Method]

Description will be made below regarding the second method employed in the aforementioned filter control unit 131. With the second method, the tap size N of the interpolation filter and the initial value $c_0(i,j)$ of the filter coefficient of the interpolation filter are extracted from the interpolation filter control information k included in the entropy decoded prediction information C, and the filter coefficient thus extracted is determined to be the filter coefficient c(i,j) of the interpolation filter. Subsequently, the filter control unit 131 outputs the filter coefficient c(i,j) of the interpolation filter thus determined.

With the video encoding apparatus AA described above, the initial value $c_0(i,j)$ of the filter coefficient of the interpolation filter included in the interpolation filter initial control information b thus input is used as the filter coefficient c(i,j) of the interpolation filter. Thus, such an arrangement is capable of determining the interpolation filter without performing a large amount of operations. Thus, by inputting, to the video encoding apparatus AA, the filter coefficient c(i,j) of the interpolation filter coefficient of the optimal or near-optimal interpolation filter for the raw image as the initial value $c_0(i,j)$ of the filter coefficient of the interpolation filter, such an arrangement allows the video encoding apparatus AA to perform real-time processing having improved encoding performance.

Furthermore, with the video decoding apparatus BB, the initial value $c_0(i,j)$ of the filter coefficient of the interpolation filter included in the encoded data c output from the video encoding apparatus AA is determined to be the filter coefficient c(i,j) of the interpolation filter, and the decoded pixel values A are generated using the filter coefficient c(i,j) of the interpolation filter thus determined. Thus, such an arrangement is capable of generating the decoded pixel values A without involving a large amount of operations. Thus, by inputting, to the video decoding apparatus BB, the filter coefficient c(i,j) of the interpolation filter coefficient of the optimal or near-optimal interpolation filter for the raw image as the initial value $c_0(i,j)$ of the filter coefficient of the interpolation filter, such an arrangement allows the video decoding apparatus BB to perform real-time processing having improved decoding performance.

[Second Embodiment]
[Configuration of Video Encoding Apparatus CC]

Description will be made below regarding a video encoding apparatus CC according to a second embodiment of the present invention. The video encoding apparatus CC has the same configuration as that of the video encoding apparatus AA according to the first embodiment of the present invention shown in FIG. 1. With regard to the video encoding apparatus CC, the same components as those of the video encoding apparatus AA are denoted by the same reference numerals, and description thereof will be omitted. It should be noted that the filter control unit 21 of the video encoding apparatus AA determines the filter coefficient c(i,j) of the interpolation filter using the aforementioned first method. In contrast, the filter control unit 21 of the video encoding apparatus CC determines the filter coefficient c(i,j) of the interpolation filter using a third method described later.

[Third Method]

With the third method, first, the pixel value variance $\sigma_0$ of the raw image in the coding target frame is extracted from the input video image a. Furthermore, the tap size N of the interpolation filter and the initial value $c_0(i,j)$ of the filter coefficient of the interpolation filter are extracted from the interpolation filter initial control information b.

Subsequently, a main band $\omega_t$, the filter characteristics of which are to be changed, is determined according to the pixel value variance $\sigma_0$ of the raw image. Specifically, for example, in a case in which filter characteristics represented by Expression (1) are updated by changing the filter characteristics of the main band, the main band $\omega_t$ is determined according to the operation represented by Expression (2).

[Expression 1]
$$\omega = (N-2) \times \frac{\pi}{N} \quad (1)$$

[Expression 2]
$$\omega_t = (N-2) \times \frac{\pi}{N} \times a \times \sigma_0 \quad (2)$$

It should be noted that, in Expression (2), "a" represents a weighting coefficient for the characteristics of the video image. With the filter characteristics before updating as $c_0(\omega)$, and with the filter characteristics after updating as $C(\omega)$, the filter characteristics $c_0(\omega_t)$ with respect to the main band $\omega_t$ before updating are represented by the following Expression (3).

[Expression 3]
$$C_0(\omega_t) = \left(1 - \frac{1}{2} \times a \times \sigma_0 \times (N-2)\right) \times C_0\left((N-2) \times \frac{\pi}{N}\right) \quad (3)$$

Subsequently, the change of the filter characteristics with respect to the main band $\omega_t$ is determined based upon the pixel value variance $\sigma_0$ of the raw image and the pixel value variance $\sigma_c$ of the reference image in the reference frame. Here, the relation between the filter characteristics $c_0(\omega_t)$ of the main band $\omega_t$ before updating and the filter characteristics $C(\omega_t)$ of the main band $\omega_t$ after updating is represented by the following Expression (4).

[Expression 4]

$$C(\omega_t) = C_0(\omega_t) \times \frac{\sigma_c}{\sigma_0} \quad (4)$$

Thus, the filter characteristics of the main band $(N-2) \times \pi/N$ can be determined based upon the filter characteristics $C(\omega)$ after updating as represented by the following Expression (5).

[Expression 5]

$$C\left((N-2) \times \frac{\pi}{N}\right) = C_0\left((N-2) \times \frac{\pi}{N}\right) - (C(\omega_t) - C_0(\omega_t)) \times \frac{2\pi}{N} \times \frac{1}{(\pi - \omega_t)^2} \quad (5)$$

Subsequently, with regard to the initial value $c_0(i,j)$ of the filter coefficient of the interpolation filter, the filter coefficient $c(i,j)$ is updated according to the change in the filter characteristics thus determined as described above. Specifically, the desired filter characteristics $C(\omega)$ represented by Expression (5) are inverse Fourier transformed, thereby determining the filter coefficient $c(i,j)$ of the interpolation filter.

[Configuration of Video Decoding Apparatus DD]

Description will be made regarding a video decoding apparatus DD according to the second embodiment of the present invention. The video decoding apparatus DD is configured to decode the encoded data c generated by the video encoding apparatus CC, and has the same configuration as that of the video decoding apparatus BB according to the first embodiment of the present invention shown in FIG. 3. With regard to the video decoding apparatus DD, the same components as those of the video decoding apparatus BB are denoted by the same reference numerals, and description thereof will be omitted. It should be noted that the filter control unit 131 of the video decoding apparatus BB determines the filter coefficient $c(i,j)$ of the interpolation filter using the aforementioned second method. In contrast, the filter control unit 131 of the video decoding apparatus DD determines the filter coefficient $c(i,j)$ of the interpolation filter using a fourth method described later.

[Fourth Method]

With the fourth method, first, the variance $\sigma_0$ of the pixel values of the raw image is extracted from the decoded pixel values A. Furthermore, the tap size N of the interpolation filter and the initial value $c_0(i,j)$ of the filter coefficient of the interpolation filter are extracted from the interpolation filter control information k included in the entropy decoded prediction information C.

Subsequently, in the same way as the third method described above, the main band $\omega_t$, the filter characteristics of which are to be changed, is determined according to the pixel value variance $\sigma_0$ of the raw image.

Subsequently, in the same way as the third method described above, the change of the filter characteristics of the main band $\omega_t$ is determined according to the pixel value variance $\sigma_0$ of the raw image and the pixel value variance $\sigma_c$ of the reference image.

Subsequently, in the same way as the third method described above, with regard to the initial value $c_0(i,j)$ of the filter coefficient of the interpolation filter, the filter coefficient $c(i,j)$ of the interpolation filter is updated according to the change of the filter characteristics thus determined as described above.

With the video encoding apparatus CC described above, the filter coefficient $c(i,j)$ of the interpolation filter is determined using the tap size N of the interpolation filter and the initial value $c_0(i,j)$ of the filter coefficient of the interpolation filter included in the input interpolation filter initial control information b, the pixel value variance $\sigma_0$ of the raw image included in the input video image a thus input, and the pixel value variance $\sigma c$ of the reference image. Thus, such an arrangement is capable of determining the interpolation filter without involving a large amount of operations. Thus, such an arrangement allows the video encoding apparatus CC to perform real-time processing having improved encoding performance.

With the video decoding apparatus DD described above, the decoded image pixel values A are generated using the tap size N of the interpolation filter included in the encoded data c output from the video encoding apparatus CC, the initial value $c_0(i,j)$ of the filter coefficient of the interpolation filter, the variance $\sigma_0$ of the pixel values of the raw image, and the variance $\sigma c$ of the pixel values of the reference image. Thus, such an arrangement is capable of generating the decoded pixel values A without involving a large amount of operations. Thus, such an arrangement allows the video decoding apparatus DD to perform real-time processing having improved decoding performance.

[Third Embodiment]

[Configuration of Video Encoding Apparatus EE]

Description will be made below regarding a video encoding apparatus EE according to a third embodiment of the present invention. The video encoding apparatus EE has the same configuration as that of the video encoding apparatus AA according to the first embodiment of the present invention shown in FIG. 1. With regard to the video encoding apparatus EE, the same components as those of the video encoding apparatus AA are denoted by the same reference numerals, and description thereof will be omitted. It should be noted that the filter control unit 21 of the video encoding apparatus AA determines the filter coefficient $c(i,j)$ of the interpolation filter using the aforementioned first method. In contrast, the filter control unit 21 of the video encoding apparatus EE determines the filter coefficient $c(i,j)$ of the interpolation filter using a fifth method described later.

[Fifth Method]

With the fifth method, first, the inter-pixel correlation $R_0$ regarding the pixel values of the raw image in the coding target frame is extracted from the input video image a. Furthermore, the tap size N of the interpolation filter and the initial value $c_0(i,j)$ of the filter coefficient of the interpolation filter are extracted from the interpolation filter initial control information b.

Subsequently, the main band $\omega_t$, the filter characteristics of which are to be changed, is determined based upon the inter-pixel correlation $R_0$ with respect to the pixel values of the raw image. Specifically, in a case in which, for example, the filter characteristics represented by the aforementioned Expression (1) are updated by changing the filter characteristics set for the main band, the main band $\omega_t$ is determined by the operation represented by the following Expression (6).

[Expression 6]

$$\omega_t = (N-2) \times \frac{\pi}{N} \times a \times R_0 \quad (6)$$

It should be noted that, in Expression (6), "a" is a weighting coefficient for the characteristics of the video image.

With the filter characteristics before updating as $c_0(\omega)$, and with the filter characteristics after updating as $C(\omega)$, the filter characteristics $c_0(\omega_t)$ with respect to the main band $\omega_t$ before updating are represented by the following Expression (7).

[Expression 7]

$$C_0(\omega_t) = \left(1 - \frac{1}{2} \times a \times R_0 \times (N-2)\right) \times C_0\left((N-2) \times \frac{\pi}{N}\right) \quad (7)$$

Subsequently, the change of the filter characteristics with respect to the main band $\omega_t$ is determined based upon the inter-pixel correspondence $R_0$ with respect to the pixel values of the raw image and the inter-pixel correspondence $R_c$ with respect to the pixel values of the reference image in the reference frame. Here, the relation between the filter characteristics $C_0(\omega_t)$ for the main band $\omega_t$ before updating and the filter characteristics $C(\omega_t)$ for the main band $\omega_t$ after updating is represented by the following Expression (8).

[Expression 8]

$$C(\omega_t) = C_0(\omega_t) \times \frac{R_c}{R_0} \quad (8)$$

Thus, the filter characteristics for the band$(N-2) \times \pi/N$ can be determined based upon the filter characteristics $C(\omega)$ after updating as represented by the aforementioned Expression (5).

Subsequently, with regard to the initial value $c_0(i,j)$ of the filter coefficient of the interpolation filter, the filter coefficient $c(i,j)$ is updated according to the change in the filter characteristics thus determined as described above. Specifically, the desired filter characteristics $C(\omega)$ represented by Expression (5) are inverse Fourier transformed, thereby determining the filter coefficient $c(i,j)$ of the interpolation filter.

[Configuration of Video Decoding Apparatus FF]

Description will be made below regarding a video decoding apparatus FF according to the third embodiment of the present invention. The video decoding apparatus FF is configured to decode the encoded data c generated by the video encoding apparatus EE, and has the same configuration as that of the video decoding apparatus BB according to the first embodiment of the present invention shown in FIG. 3. With regard to the video decoding apparatus FF, the same components as those of the video decoding apparatus BB are denoted by the same reference numerals, and description thereof will be omitted. It should be noted that the filter control unit 131 of the video decoding apparatus BB determines the filter coefficient $c(i,j)$ of the interpolation filter using the aforementioned second method. In contrast, the filter control unit 131 of the video decoding apparatus FF determines the filter coefficient $c(i,j)$ of the interpolation filter using a sixth method described later.

[Sixth Method]

With the sixth method, first, the inter-pixel correspondence $R_0$ with respect to the pixel values of the raw image is extracted from the decoded pixel values A. Furthermore, the tap size N of the interpolation filter and the initial value $c_0$ of the filter coefficient of the interpolation filter are extracted from the interpolation filter control information k included in the entropy decoded prediction information C.

Subsequently, in the same way as the fifth method described above, the main band $\omega_t$, the filter characteristics of which are to be changed, is determined according to the inter-pixel correspondence $R_0$ with respect to the pixel values of the raw image.

Subsequently, in the same way as the fifth method described above, the change of the filter characteristics of the main band $\omega_t$ is determined according to the inter-pixel correspondence $R_0$ with respect to the pixel values of the raw image and the inter-pixel correspondence $R_c$ of the pixel values of the reference image.

Subsequently, in the same way as the fifth method described above, with regard to the initial value $c_0(i,j)$ of the filter coefficient of the interpolation filter, the filter coefficient $c(i,j)$ of the interpolation filter is updated according to the change of the filter characteristics thus determined as described above.

With the video encoding apparatus EE described above, the filter coefficient $c(i,j)$ of the interpolation filter is determined using the tap size N of the interpolation filter and the initial value $c_0(i,j)$ of the filter coefficient of the interpolation filter included in the input interpolation filter initial control information b, the inter-pixel correspondence $R_0$ with respect to the pixel values of the raw image included in the input video image a, and the inter-pixel correspondence $R_c$ with respect to the pixel values of the reference image. Thus, such an arrangement is capable of determining the interpolation filter without involving a large amount of operations. Thus, such an arrangement allows the video encoding apparatus CC to perform real-time processing having improved encoding performance.

With the video decoding apparatus FF described above, the decoded image pixel values A are generated using the tap size N of the interpolation filter included in the encoded data c output from the video encoding apparatus EE, the initial value $c_0(i,j)$ of the filter coefficient of the interpolation filter, the inter-pixel correspondence $R_0$ with respect to the pixel values of the raw image, and the inter-pixel correspondence $R_c$ with respect to the pixel values of the reference image. Thus, such an arrangement is capable of generating the decoded pixel values A without involving a large amount of operations. Thus, such an arrangement allows the video decoding apparatus FF to perform real-time processing having improved encoding performance.

[Fourth Embodiment]

[Configuration of Video Encoding Apparatus GG]

Description will be made below regarding a video encoding apparatus GG according to a fourth embodiment of the present invention. The video encoding apparatus GG has the same configuration as that of the video encoding apparatus AA according to the first embodiment of the present invention shown in FIG. 1. With regard to the video encoding apparatus GG, the same components as those of the video encoding apparatus AA are denoted by the same reference numerals, and description thereof will be omitted. It should be noted that the filter control unit 21 of the video encoding apparatus AA determines the filter coefficient $c(i,j)$ of the interpolation filter using the aforementioned first method. In contrast, the filter control unit 21 of the video encoding apparatus GG determines the filter coefficient c(i,j) of the interpolation filter using a seventh method described later.

[Seventh Method]

With the seventh method, first, the frequency characteristics V of the pixel values of the raw image in the encoding target frame are extracted from the input video image a. Furthermore, the tap size N of the interpolation filter and the initial value $c_0(i,j)$ of the filter coefficient of the interpolation filter are extracted from the interpolation filter initial control information b.

Subsequently, the frequency characteristics V of the pixel values of the raw image are calculated for (N/2+1) equally-divided regions, thereby obtaining the frequency characteristics V. Furthermore, the frequency characteristics W of the reference image in the reference frame are calculated for (N/2+1) equally-divided regions, thereby obtaining the frequency characteristics $W_x$.

Subsequently, the frequency characteristics $D_x$ with respect to the prediction error value are obtained based upon the frequency characteristics $V_x$ and $W_x$.

Subsequently, the main band $\omega_t$, the filter characteristics of which are to be changed, is determined based upon the frequency characteristics $V_x$ and $D_x$. Specifically, for example, the ratio H between the frequency characteristics with respect to the prediction error value and the frequency characteristics with respect to the raw image is obtained by the operation represented by the following Expression (9) using the frequency characteristics $D_x$ and $M_x$. Here, "H" represents the peak frequency, i.e., the main band $\omega_t$.

[Expression 9]

$$H = \frac{|D_X|}{|M_X|} \quad (9)$$

Subsequently, the change of the filter characteristics to be applied to the main band $\omega_t$ is determined based upon the frequency characteristics $V_x$ and $D_x$. With the filter characteristics before updating as $c_0(\omega)$, and with the filter characteristics after updating as $C(\omega)$, the relation between the filter characteristics $c_0(\omega_t)$ with respect to the main band $\omega_t$ before updating and the filter characteristics $C(\omega_t)$ with respect to the main band $\omega_t$ after updating is represented by the following Expression (10).

[Expression 10]

$$C(\omega_t) = C_0(\omega_t) \times \text{clip}(1-H) \quad (10)$$

It should be noted that "clip(x)" in the Expression 10 is defined by the following Expression (11).

[Expression 11]

$$\text{clip}(x) = \begin{cases} 1 & (x \geq 1) \\ x & (0 \leq x < 1) \\ 0 & (x < 0) \end{cases} \quad (11)$$

Subsequently, with regard to the initial value $c_0(i,j)$ of the filter coefficient of the interpolation filter, the filter coefficient c(i,j) of the interpolation filter is updated based upon the change of the filter characteristics thus determined as described above. Specifically, the filter characteristics of the bands $\omega_n$ (n=−N/2, −N/2+1, ..., −1, 0, 1, ..., N/2−1, N/2) are obtained by the operation represented by the following Expression (12) based upon the filter characteristics $C(\omega_t)$ after updating. Subsequently, the desired filter characteristics $C(\omega)$ represented by Expression (12) are inverse Fourier transformed, thereby determining the filter coefficient c(i,j) of the interpolation filter.

[Expression 12]

$$C(\omega_n) = \begin{cases} C_0(\omega_n) & (|\omega_n| < \omega_s) \\ \dfrac{(\omega_t - \omega_n)C_0(\omega_s) + (\omega_n - \omega_s)C(\omega_t)}{\omega_t - \omega_s} & (\omega_s < |\omega_n| < \omega_t) \\ \dfrac{(\pi - \omega_t)C_0(\omega_t)}{\pi - \omega_t} & (\omega_t < |\omega_n| \leq \pi) \end{cases} \quad (12)$$

It should be noted that, in Expression (12), $\omega s$ (>0) represents the minimum band $\omega$ for which the amplitude ratio H, between the frequency characteristics with respect to the prediction error value and the frequency characteristics with respect to the raw image, is greater than a threshold value T.

[Configuration of Video Decoding Apparatus HH]

Description will be made regarding a video decoding apparatus HH according to the fourth embodiment of the present invention. The video decoding apparatus HH is configured to decode the encoded data c generated by the video encoding apparatus GG, and has the same configuration as that of the video decoding apparatus BB according to the first embodiment of the present invention shown in FIG. 3. With regard to the video decoding apparatus HH, the same components as those of the video decoding apparatus BB are denoted by the same reference numerals, and description thereof will be omitted. It should be noted that the filter control unit 131 of the video decoding apparatus BB determines the filter coefficient c(i,j) of the interpolation filter using the aforementioned second method. In contrast, the filter control unit 131 of the video decoding apparatus HH determines the filter coefficient c(i,j) of the interpolation filter using an eighth method described later.

[Eighth Method]

With the eighth method, first, the information with respect to the frequency characteristics Vx of the pixel value signal of the raw image is extracted from the decoded pixel values A. Furthermore, the tap size N of the interpolation filter and the initial value $c_0(i,j)$ of the filter coefficient of the interpolation filter are extracted from the interpolation filter control information k included in the entropy decoded prediction information. Moreover, the frequency characteristics $W_x$ of the pixel value signal of the reference image are obtained. In addition, the frequency characteristics $D_x$ of the prediction error values are calculated based upon the frequency characteristics $V_x$ and $W_x$.

Subsequently, in the same way as the seventh method described above, the main band $\omega_t$, the filter characteristics of which are to be changed, is determined based upon the frequency characteristics $V_x$ and $W_x$.

Subsequently, in the same way as the seventh method described above, the change of the filter characteristics of the main band $\omega_t$ is determined according to the frequency characteristics $V_x$ and $D_x$.

Subsequently, in the same way as the seventh method described above, with regard to the initial value $c_0(i,j)$ of the filter coefficient of the interpolation filter, the filter coefficient c(i,j) of the interpolation filter is updated according to the change of the filter characteristics thus determined as described above.

With the video encoding apparatus GG described above, the filter coefficient c(i,j) of the interpolation filter is determined using the tap size N of the interpolation filter and the initial value $c_0(i,j)$ of the filter coefficient of the interpolation filter included in the input interpolation filter initial control information b, and the frequency characteristics V of the pixel values of the raw image included in the input video image a. Thus, such an arrangement is capable of determining the interpolation filter without involving a large amount of operations. Thus, such an arrangement allows the video encoding apparatus GG to perform real-time processing having improved encoding performance.

With the video decoding apparatus HH described above, the decoded image pixel values A are generated using the tap size N of the interpolation filter included in the encoded data c output from the video encoding apparatus GG, the initial value $c_0(i,j)$ of the filter coefficient of the interpolation filter, and the information with respect to the frequency characteristics $V_x$ of the pixel value signal of the raw image. Thus, such an arrangement allows the video decoding apparatus HH to perform real-time processing having improved encoding performance.

[Fifth Embodiment]
[Configuration of Video Encoding Apparatus II]

Description will be made below regarding a video encoding apparatus II according to a fifth embodiment of the present invention. The video encoding apparatus II has the same configuration as that of the video encoding apparatus AA according to the first embodiment of the present invention shown in FIG. 1. With regard to the video encoding apparatus II, the same components as those of the video encoding apparatus AA are denoted by the same reference numerals, and description thereof will be omitted. It should be noted that the filter control unit 21 of the video encoding apparatus AA determines the filter coefficient c(i,j) of the interpolation filter using the aforementioned first method. In contrast, the filter control unit 21 of the video encoding apparatus II determines the filter coefficient c(i,j) of the interpolation filter using a ninth method described later.

[Ninth Method]

With the ninth method, first, the tap size N of the interpolation filter and the initial value $c_0(i,j)$ of the filter coefficient of the interpolation filter are extracted from the interpolation filter initial control information b.

Next, the main band $\omega_t$, the filter characteristics of which are to be changed, and the change of the filter characteristics to be applied to the main band $\omega_t$ are determined based upon a quantization parameter Qp that is input in the same way as the input video image a and the interpolation filter initial control information b. Specifically, for example, before the filter characteristics represented by the aforementioned Expression (1) are updated, the main band $\omega_t$ is determined by the operation represented by the following Expression (13).

[Expression 13]

$$\omega_t = (N-2) \times \frac{\pi}{N} \times \left(1 + \frac{Qp_{Max} - Qp}{Qp_{Max}}\right) \qquad (13)$$

It should be noted that, in Expression (13), "$Qp_{max}$" represents the upper limit value of the quantization parameter Qp, which is information shared by the video encoding apparatus II and a video decoding apparatus JJ described later. With the filter characteristics before updating as $c_0(\omega)$, and with the filter characteristics after updating as $C(\omega)$, the relation between the filter characteristics $c_0(\omega_t)$ with respect to the main band $\omega_t$ before updating and the filter characteristics $C(\omega_t)$ with respect to the main band $\omega_t$ after updating is represented by the following Expression (14).

[Expression 14]

$$C(\omega_t) = C_0(\omega_t) \times \frac{1 - Qp}{Qp_{Max}} \qquad (14)$$

The filter characteristics of the band $(N-2) \times \pi/N$ can be determined based upon the filter characteristics $C(\omega)$ after updating as represented by the aforementioned Expression (5).

Subsequently, with regard to the initial value $c_0(i,j)$ of the filter coefficient of the interpolation filter, the filter coefficient c(i,j) is updated according to the change in the filter characteristics thus determined as described above. Specifically, the desired filter characteristics $C(\omega)$ represented by Expression (5) are inverse Fourier transformed, thereby determining the filter coefficient c(i,j) of the interpolation filter.

[Configuration of Video Decoding Apparatus JJ]

Description will be made regarding a video decoding apparatus JJ according to the fifth embodiment of the present invention. The video decoding apparatus JJ is configured to decode the encoded data c generated by the video encoding apparatus II, and has the same configuration as that of the video decoding apparatus BB according to the first embodiment of the present invention shown in FIG. 3. With regard to the video decoding apparatus JJ, the same components as those of the video decoding apparatus BB are denoted by the same reference numerals, and description thereof will be omitted. It should be noted that the filter control unit 131 of the video decoding apparatus BB determines the filter coefficient c(i,j) of the interpolation filter using the aforementioned second method. In contrast, the filter control unit 131 of the video decoding apparatus JJ determines the filter coefficient c(i,j) of the interpolation filter using a tenth method described later.

[Tenth Method]

With the tenth method, first, the tap size N of the interpolation filter and the initial value $c_0(i,j)$ of the filter coefficient of the interpolation filter are extracted from the interpolation filter control information k included in the entropy decoded prediction information C.

Subsequently, in the same way as the ninth method described above, the main band $\omega_t$, the filter characteristics of which are to be changed, and the change of the filter characteristics to be applied to the main band $\omega_t$ are determined based upon the quantization parameter Qp input in the same way as the encoded data c.

Subsequently, in the same way as the ninth method described above, with regard to the initial value $c_0(i,j)$ of the filter coefficient of the interpolation filter, the filter coefficient c(i,j) of the interpolation filter is updated according to the change of the filter characteristics thus determined as described above.

With the video encoding apparatus II described above, the filter coefficient c(i,j) of the interpolation filter is determined using the tap size N of the interpolation filter and the initial value $c_0(i,j)$ of the filter coefficient of the interpolation filter included in the input interpolation filter initial control information b, and the quantization parameter Qp. Thus, such an arrangement is capable of determining the interpolation filter without involving a large amount of operations. Thus, such an arrangement allows the video encoding apparatus II to perform real-time processing having improved encoding performance.

With the video decoding apparatus JJ described above, the decoded image pixel values A are generated using the tap size N of the interpolation filter included in the encoded data c output from the video encoding apparatus II, the initial value $c_0(i,j)$ of the filter coefficient of the interpolation filter, and the quantization parameter Qp. Thus, such an arrangement allows the video decoding apparatus JJ to perform real-time processing having improved encoding performance.

[Sixth Embodiment]
[Configuration of Video Encoding Apparatus KK]

Description will be made below regarding a video encoding apparatus KK according to a sixth embodiment of the present invention. The video encoding apparatus KK has the same configuration as that of the video encoding apparatus AA according to the first embodiment of the present invention shown in FIG. 1. With regard to the video encoding apparatus KK, the same components as those of the video encoding apparatus AA are denoted by the same reference numerals, and description thereof will be omitted. It should be noted that the filter control unit 21 of the video encoding apparatus AA determines the filter coefficient $c(i,j)$ of the interpolation filter using the aforementioned first method. In contrast, the filter control unit 21 of the video encoding apparatus KK determines the filter coefficient $c(i,j)$ of the interpolation filter using an eleventh method described later.

[Eleventh Method]

With the eleventh method, first, the tap size N of the interpolation filter and the initial value $c_0(i,j)$ of the filter coefficient of the interpolation filter are extracted from the interpolation filter initial control information b.

Next, the main band $\omega_t$, the filter characteristics of which are to be changed, and the change of the filter characteristics to be applied to the main band $\omega_t$ are determined based upon a quantization step size Qw that is input in the same way as the input video image a and the interpolation filter initial control information b. Specifically, for example, before the filter characteristics represented by the aforementioned Expression (1) are updated, the main band $\omega_t$ is determined by the operation represented by the following Expression (15).

[Expression 15]
$$\omega_t = (N-2) \times \frac{\pi}{N} \times \left(1 + \frac{Qw_{Max} - Qw}{Qw_{Max}}\right) \quad (15)$$

It should be noted that, in Expression (15), "QWmax" represents the upper limit value of the quantization step size Qw, which is information shared by the video encoding apparatus KK and a video decoding apparatus LL described later. With the filter characteristics before updating as $c_0(\omega)$, and with the filter characteristics after updating as $C(\omega)$, the relation between the filter characteristics $c_0(\omega)$ with respect to the main band $\omega_t$ before updating and the filter characteristics $C(\omega_t)$ with respect to the main band $\omega_t$ after updating is represented by the following Expression (16).

[Expression 16]
$$C(\omega_t) = C_0(\omega_t) \times \frac{1 - Qw}{Qw_{Max}} \quad (16)$$

Thus, the filter characteristics of the band $(N-2) \times \pi/N$ can be determined based upon the filter characteristics $C(\omega)$ after updating as represented by the aforementioned Expression (5).

Subsequently, with regard to the initial value $c_0(i,j)$ of the filter coefficient of the interpolation filter, the filter coefficient $c(i,j)$ is updated according to the change in the filter characteristics thus determined as described above. Specifically, the desired filter characteristics $C(\omega)$ are inverse Fourier transformed, thereby determining the filter coefficient $c(i,j)$ of the interpolation filter.

[Configuration of Video Decoding Apparatus LL]

Description will be made below regarding a video decoding apparatus LL according to the sixth embodiment of the present invention. The video decoding apparatus LL is configured to decode the encoded data c generated by the video encoding apparatus KK, and has the same configuration as that of the video decoding apparatus BB according to the first embodiment of the present invention shown in FIG. 3. With regard to the video decoding apparatus LL, the same components as those of the video decoding apparatus BB are denoted by the same reference numerals, and description thereof will be omitted. It should be noted that the filter control unit 131 of the video decoding apparatus BB determines the filter coefficient $c(i,j)$ of the interpolation filter using the aforementioned second method. In contrast, the filter control unit 131 of the video decoding apparatus LL determines the filter coefficient $c(i,j)$ of the interpolation filter using a twelfth method described later.

[Twelfth Method]

With the twelfth method, first, the tap size N of the interpolation filter and the initial value $c_0(i,j)$ of the filter coefficient of the interpolation filter are extracted from the interpolation filter control information k included in the entropy decoded prediction information C.

Subsequently, in the same way as the eleventh method described above, the main band $\omega_t$, the filter characteristics of which are to be changed, and the change of the filter characteristics to be applied to the main band $\omega_t$ are determined based upon the quantization step size Qw input in the same way as the encoded data c.

Subsequently, in the same way as the eleventh method described above, with regard to the initial value $c_0(i,j)$ of the filter coefficient of the interpolation filter, the filter coefficient $c(i,j)$ of the interpolation filter is updated according to the change of the filter characteristics thus determined as described above.

With the video encoding apparatus KK described above, the filter coefficient $c(i,j)$ of the interpolation filter is determined using the tap size N of the interpolation filter and the initial value $c_0(i,j)$ of the filter coefficient of the interpolation filter included in the input interpolation filter initial control information b, and the quantization step size Qw. Thus, such an arrangement is capable of determining the interpolation filter without involving a large amount of operations. Thus, such an arrangement allows the video encoding apparatus KK to perform real-time processing having improved encoding performance.

With the video decoding apparatus LL described above, the decoded image pixel values A are generated using the tap size N of the interpolation filter included in the encoded data c output from the video encoding apparatus KK, the initial value $c_0(i,j)$ of the filter coefficient of the interpolation filter, and the quantization step size Qw. Thus, such an arrangement allows the video decoding apparatus LL to perform real-time processing having improved decoding performance.

It should be noted that the operation of the video encoding apparatus AA, CC, EE, II, or KK, or the operation of the image decoding apparatus BB, DD, FF, HH, JJ, or LL, may be stored in a computer-readable storage medium. Also, the video encoding apparatus AA, CC, EE, II, or KK, or the video decoding apparatus BB, DD, FF, HH, JJ, or LL, may read out a program stored in a storage medium, and may execute the program thus read out. Such an arrangement also provides the present invention.

Also, the aforementioned program may be transmitted from the video encoding apparatus AA, CC, EE, GG, II, or KK, or the video decoding apparatus BB, DD, FF, HH, JJ, or LL, which stores the program in a storage device, to another computer system via a transmission medium or transmission wave in a transmission medium. The term "transmission medium" as used here represents a medium having a function of transmitting information, examples of which include a network (communication network) such as the Internet, etc., a communication link (communication line) etc.

Also, the aforementioned program may be configured to provided a part of the aforementioned functions. Also, the aforementioned program may be configured to provide the aforementioned functions in combination with a different program already stored in the video encoding apparatus AA, CC, EE, GG, II, or KK, or the video decoding apparatus BB, DD, FF, HH, JJ, or LL. That is to say, the aforementioned program may be configured as a differential file (differential program).

Detailed description has been made regarding the embodiments of the present invention with reference to the drawings. However, the specific configuration thereof is not restricted to the above-described embodiments. Rather, any modifications may be made without departing from the spirit of the present invention.

For example, description has been made in the above-described embodiments regarding an arrangement in which the filter control unit 21 uses only one of the first method, third method, fifth method, seventh method, ninth method, or eleventh method. However, the present invention is not restricted to such an arrangement. For example, the filter control unit 21 may use a method obtained by combining any of the third method, fifth method, or seventh method with either of the ninth method or eleventh method.

Description has been made in the embodiments regarding a video encoding method in which prediction encoding is performed based upon motion compensation prediction. However, the present invention is not restricted to such an arrangement. Also, the present invention can be applied to a video encoding method in which prediction encoding is performed based upon block matching in the same way as with motion compensation prediction.

Specifically, the present invention can be applied to a multiview video image encoding method in which video images (multiview video images) acquired by multiple cameras are compressed with high efficiency. Examples of such a multiview video image encoding method include H.264 MVC (Multiview Video Coding). With H.264 MVC, prediction encoding is performed based upon block matching between different viewpoints (disparity compensation prediction). The present invention can easily be applied to disparity compensation prediction.

Also, the present invention can easily be applied to prediction encoding based upon block matching between different image resolutions in a method in which video images having multiple resolutions are compressed together (scalable coding method).

[DESCRIPTION OF THE REFERENCE NUMERALS]

| | |
|---|---|
| AA, CC, EE, GG, II, KK | video encoding apparatus |
| BB, DD, FF, HH, JJ, LL | video decoding apparatus |
| 1 | intra-encoding predicted value generating unit |
| 2 | inter-encoding predicted value generating unit |
| 3 | mode decision control unit |
| 4 | DCT/quantization unit |
| 5 | IDCT/inverse quantization unit |
| 6 | entropy encoding unit |
| 7 | first local memory |
| 8 | second local memory |
| 21 | filter control unit |
| 22 | fractional position interpolated value generating unit |
| 23 | motion compensation processing unit |
| 110 | encoded data analyzing unit |
| 120 | intra-predicted value generating unit |
| 130 | inter-predicted value generating unit |
| 140 | prediction method control unit |
| 150 | memory |
| 131 | filter control unit |
| 132 | fractional position interpolated value generating unit |
| 133 | motion compensation processing unit |

What is claimed is:

1. A video encoding apparatus configured to be capable of using an interpolated value with fractional position accuracy to perform prediction encoding based upon block matching between different frames, the video encoding apparatus comprising:

an input reception unit configured to receive the number of taps set for an interpolation filter and an initial value of an interpolation filter coefficient;

an interpolation filter generating unit configured to generate an interpolation filter based upon the initial value of the interpolation filter coefficient received by the input reception unit; and an encoded data generating unit configured to generate encoded data using the interpolation filter generated by the interpolation filter generating unit, wherein the interpolation filter generating unit updates the interpolation filter coefficient with respect to the initial value of the interpolation filter coefficient received by the input reception unit, based upon the number of taps set for the interpolation filter received by the input reception unit and video image feature values, and generates an interpolation filter based upon the interpolation filter coefficient thus updated, wherein updates to the interpolation filter coefficient are performed adaptively to vary behavior of the interpolation filter in real time in response to the video image feature values, wherein the video image feature values are based at least in part upon a function clip(1−H), wherein H is a ratio of frequency characteristics of a predicted error value to frequency characteristics of a raw image received by the video encoding apparatus, wherein clip(1−H) equals 1 when (1−H) is greater than 1, wherein clip(1−H) equals 0 when (1−H) is less than 0, and wherein clip(1−H) equals (1−H) when (1−H) is between 0 and 1.

2. A video decoding apparatus configured to decode encoded data generated by the video encoding apparatus according to claim 1, the video decoding apparatus comprising:

a decoding-side input reception unit configured to receive, as input signals, the number of taps set for the interpolation filter and the initial value of the interpolation filter coefficient, which are received by the input reception unit; and a decoded data generating unit configured to decode the encoded data using the number of taps set for the interpolation filter and the initial value of the interpolation filter coefficient, which are received by the decoding-side input reception unit, thereby generating the decoded data.

3. A video encoding apparatus according to claim 1, wherein the interpolation filter generating unit determines a main band, the filter characteristics of which are to be changed, based upon the video image feature values of an image to be encoded, and wherein the interpolation filter generating unit determines the change of the filter characteristics to be applied to the main band, the filter characteristics of which are to be changed, based upon the video image feature values of an image to be encoded and the video image feature values of an encoded image, and wherein the interpolation filter generating unit updates the interpolation filter coefficient with respect to the initial value of the interpolation filter coefficient received by the input reception unit, based upon the number of taps set for the interpolation filter received by the input reception unit and the change of the filter characteristics thus determined, and generates an interpolation filter based upon the interpolation filter coefficient thus updated.

4. A video decoding apparatus configured to decode encoded data generated by the video encoding apparatus according to claim 3, the video decoding apparatus comprising:

a decoding-side input reception unit configured to receive, as input signals, the number of taps set for the interpolation filter and the initial value of the interpolation filter coefficient, which are received by the input reception unit; and a decoded data generating unit configured to decode the encoded data using the number of taps set for the interpolation filter and the initial value of the interpolation filter coefficient, which are received by the decoding-side input reception unit, and the video image feature values, thereby generating the decoded data.

5. A video encoding apparatus according to claim 1, wherein one from among a pixel value variance and an inter-pixel correlation of pixel values of a raw image received by the video encoding apparatus is used for the video image feature values.

6. A video decoding apparatus configured to decode encoded data generated by the video encoding apparatus according to claim 5, the video decoding apparatus comprising:

a decoding-side input reception unit configured to receive, as input signals, the number of taps set for the interpolation filter and the initial value of the interpolation filter coefficient, which are received by the input reception unit; and a decoded data generating unit configured to decode the encoded data using the number of taps set for the interpolation filter and the initial value of the interpolation filter coefficient, which are received by the decoding-side input reception unit, and the video image feature values, thereby generating the decoded data.

7. A video decoding apparatus configured to decode encoded data generated by the video encoding apparatus according to claim 1, the video decoding apparatus comprising:

a decoding-side input reception unit configured to receive, as input signals, the number of taps set for the interpolation filter and the initial value of the interpolation filter coefficient, which are received by the input reception unit; and a decoded data generating unit configured to decode the encoded data using the number of taps set for the interpolation filter and the initial value of the interpolation filter coefficient, which are received by the decoding-side input reception unit, and the video image feature values, thereby generating the decoded data.

8. A video encoding apparatus according to claim 1, wherein the interpolation filter generating unit updates the interpolation filter coefficient with respect to the initial value of the interpolation filter coefficient received by the input reception unit, based upon the number of taps set for the interpolation filter received by the input reception unit and upon encoding control information, and generates an interpolation filter based upon the interpolation filter coefficient thus updated.

9. A video encoding apparatus according to claim 8, wherein the interpolation filter generating unit determines a main band, the filter characteristics of which are to be changed, and the amount of change in the filter characteristics to be applied to the band, based upon the encoding control information, and wherein the interpolation filter generating unit updates the interpolation filter coefficient with respect to the initial value of the interpolation filter coefficient received by the input reception unit, based upon the number of taps set for the interpolation filter received by the input reception unit and upon the encoding control information, and generates an interpolation filter based upon the interpolation filter coefficient thus updated.

10. A video decoding apparatus configured to decode encoded data generated by the video encoding apparatus according to claim 9, the video decoding apparatus comprising:

a decoding-side input reception unit configured to receive, as input signals, the number of taps set for the interpolation filter and the initial value of the interpolation filter coefficient which are received by the input reception unit; and a decoded data generating unit configured to decode the encoded data using the number of taps set for the interpolation filter and the initial value of the interpolation filter coefficient which are received by the decoding-side input reception unit, and the coding control information, thereby generating the decoded data.

11. A video encoding apparatus according to claim 8, wherein a quantization parameter or a quantization step size is used as the encoding control information.

12. A video decoding apparatus configured to decode encoded data generated by the video encoding apparatus according to claim 11, the video decoding apparatus comprising:

a decoding-side input reception unit configured to receive, as input signals, the number of taps set for the interpolation filter and the initial value of the interpolation filter coefficient which are received by the input reception unit; and a decoded data generating unit configured to decode the encoded data using the number of taps set for the interpolation filter and the initial value of the interpolation filter coefficient which are received by the decoding-side input reception unit, and the coding control information, thereby generating the decoded data.

13. A video decoding apparatus configured to decode encoded data generated by the video encoding apparatus according to claim 8, the video decoding apparatus comprising:
   a decoding-side input reception unit configured to receive, as input signals, the number of taps set for the interpolation filter and the initial value of the interpolation filter coefficient which are received by the input reception unit; and
   a decoded data generating unit configured to decode the encoded data using the number of taps set for the interpolation filter and the initial value of the interpolation filter coefficient which are received by the decoding-side input reception unit, and the encoding control information, thereby generating the decoded data.

14. A video encoding apparatus according to claim 1, wherein the interpolation filter generating unit updates the interpolation filter coefficient with respect to the initial value of the interpolation filter coefficient received by the input reception unit, based upon the number of taps set for the interpolation filter received by the input reception unit and frequency characteristics, and generates an interpolation filter based upon the interpolation filter coefficient thus updated.

15. A video encoding apparatus according to claim 14, wherein the interpolation filter generating unit determines a main band, the filter characteristics of which are to be changed, based upon the frequency characteristics of an image to be encoded,
   and wherein the interpolation filter generating unit determines the amount of change in the filter characteristics to be applied to the main band, the filter characteristics of which are to be changed, based upon the frequency characteristics of the image to be encoded and the frequency characteristics of an encoded image,
   and wherein the interpolation filter generating unit updates the interpolation filter coefficient with respect to the initial value of the interpolation filter coefficient received by the input reception unit, based upon the number of taps set for the interpolation filter received by the input reception unit and upon the amount of change in the filter characteristics thus determined, and generates an interpolation filter based upon the interpolation filter coefficient thus updated.

16. A video decoding apparatus configured to decode encoded data generated by the video encoding apparatus according to claim 15, the video decoding apparatus comprising:
   a decoding-side input reception unit configured to receive, as input signals, the number of taps set for the interpolation filter and the initial value of the interpolation filter coefficient, which are received by the input reception unit; and
   a decoded data generating unit configured to decode the encoded data using the number of taps set for the interpolation filter and the initial value of the interpolation filter coefficient, which are received by the decoding-side input reception unit, and the frequency characteristics, thereby generating the decoded data.

17. A video decoding apparatus configured to decode encoded data generated by the video encoding apparatus according to claim 14, the video decoding apparatus comprising:
   a decoding-side input reception unit configured to receive, as input signals, the number of taps set for the interpolation filter and the initial value of the interpolation filter coefficient, which are received by the input reception unit; and
   a decoded data generating unit configured to decode the encoded data using the number of taps set for the interpolation filter and the initial value of the interpolation filter coefficient, which are received by the decoding-side input reception unit, and the frequency characteristics, thereby generating the decoded data.

18. The video encoding apparatus according to claim 1, wherein updates to the interpolation filter coefficient are performed adaptively to vary behavior of the interpolation filter in real time in response to the video image feature values, wherein the video image feature values are based at least in part upon a ratio $\sigma_c/\sigma_0$, wherein $\sigma_c$ is a pixel value variance of a reference image and $\sigma_0$ is a pixel value variance of a raw image received by the video encoding apparatus.

19. The video encoding apparatus according to claim 1, wherein updates to the interpolation filter coefficient are performed adaptively to vary behavior of the interpolation filter in real time in response to the video image feature values, wherein the video image feature values are based at least in part upon a ratio $R_c/R_0$, wherein $R_c$ is an inter-pixel correlation of a reference image and $R_0$ is an inter-pixel correlation of a raw image received by the video encoding apparatus.

* * * * *